May 17, 1966  E. L. BAKKE  3,251,467
ATTACHMENT FOR GRAIN AUGER
Filed Jan. 3, 1964  2 Sheets-Sheet 1
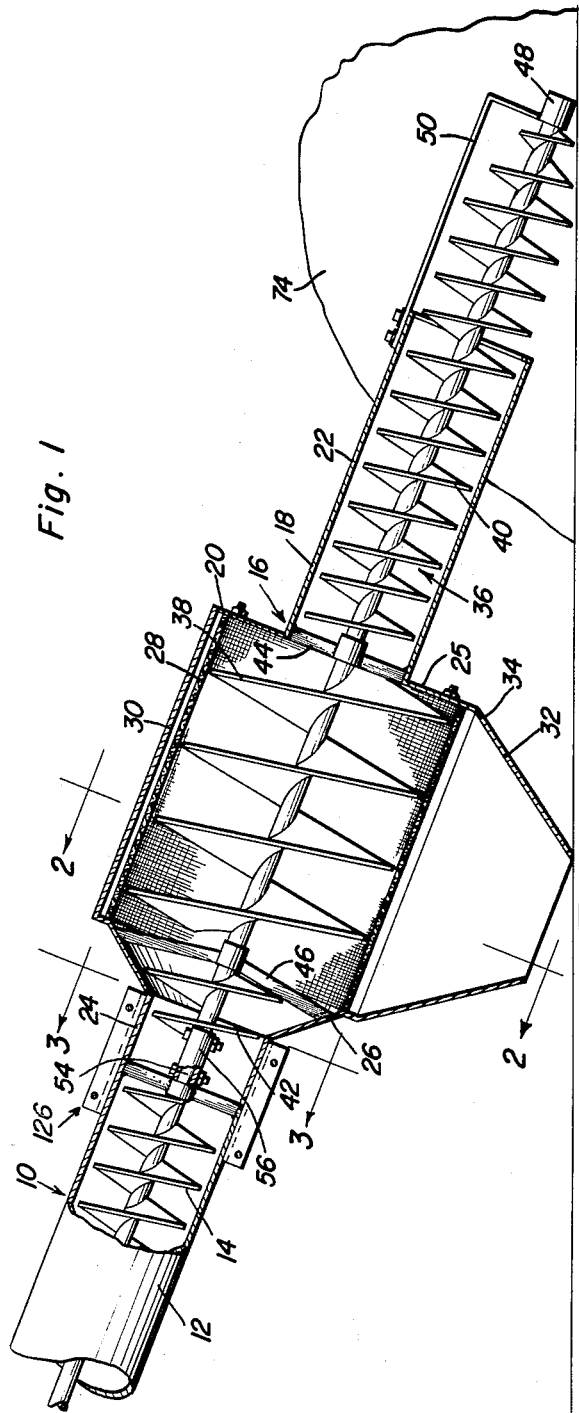
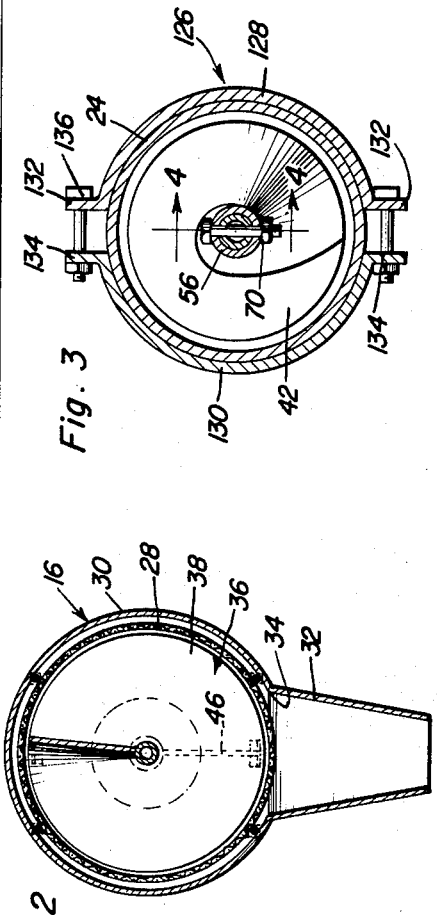
Elmer L. Bakke
INVENTOR.
BY
Attorneys May 17, 1966  E. L. BAKKE  3,251,467
ATTACHMENT FOR GRAIN AUGER
Filed Jan. 3, 1964  2 Sheets-Sheet 2

Elmer L. Bakke
INVENTOR.

United States Patent Office 3,251,467
Patented May 17, 1966

1

3,251,467
ATTACHMENT FOR GRAIN AUGER
Elmer L. Bakke, Kensal, N. Dak.
Filed Jan. 3, 1964, Ser. No. 335,596
4 Claims. (Cl. 209—241)

This invention relates to a novel and useful attachment for a grain auger conveyor of the type including a generally cylindrical housing having an elongated screw conveyor member journaled therein and the attachment includes means by which a grain cleaning attachment for removing all smaller weed seeds from the grain which is being conveyed.

The attachment of the instant invention includes an elongated cylindrical body having a diametrically enlarged center section and diametrically reduced inlet and outlet end sections with the center section including a truncated cone shaped end which tapers into the adjacent end of the outlet end section and the cylindrical body has a screw conveyor element journaled therein including a diametrically enlarged center portion and a pair of diametrically reduced opposite end portions. The center section of the cylindrical body comprises a reticulated member and an outer generally cylindrical cover is secured about the center section and has its walls spaced radially outwardly of the corresponding wall portions of the reticulated member. The cover is provided with a generally radially outwardly projecting discharge neck and the openings formed in the reticulated member are of a size to allow all small seeds to pass therethrough and retain the larger desirable seed within the cylindrical body. The outlet end of the body is adapted for connection with a conventional-type of grain auger conveyor of the type including a generally cylindrical housing having an elongated screw conveyor member journaled therein and the outlet end of the screw conveyor element journaled in the cylindrical body is adapted to be drivingly connected to the screw conveyor member of the grain auger conveyor with which the attachment is associated.

The main object of this invention is to provide a grain cleaner and separator attachment for a conventional form of grain auger and which will be capable of removing substantially all unwanted particles smaller than the minimum size of the grain which is being conveyed.

Still another object of this invention is to provide an attachment in accordance with the preceding object constructed in a manner whereby it may be readily secured to grain augers of different manufacture.

A further object of this invention is to provide an attachment for a grain auger including means by which the associated inlet end of the grain auger may be supported by the attachment of the instant invention.

Yet another object of this invention is to provide an attachment for a grain auger in accordance with the preceding objects constructed in a manner whereby it may be readily constructed of various sizes so as to offer any given desired capacity of operation.

A final object of this invention to be specifically enumerated herein is to provide an attachment in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details

2 of construction and operation as more fully hereinafter described and claimed, reference being had to the accompanying drawings forming a part hereof, wherein like numerals refer to like parts throughout, and in which:

FIGURE 1 is a longitudinal sectional view taken substantially upon the plane passing through the longitudinal centerline of one form of the attachment of the instant invention with the attachment shown secured to the inlet end of a conventional form of grain auger;

FIGURE 2 is a transverse sectional view taken substantially upon the plane indicated by the section line 2—2 of FIGURE 1;

FIGURE 3 is an enlarged transverse sectional view taken substantially upon the plane indicated by the section line 3—3 of FIGURE 1;

Figure 5:
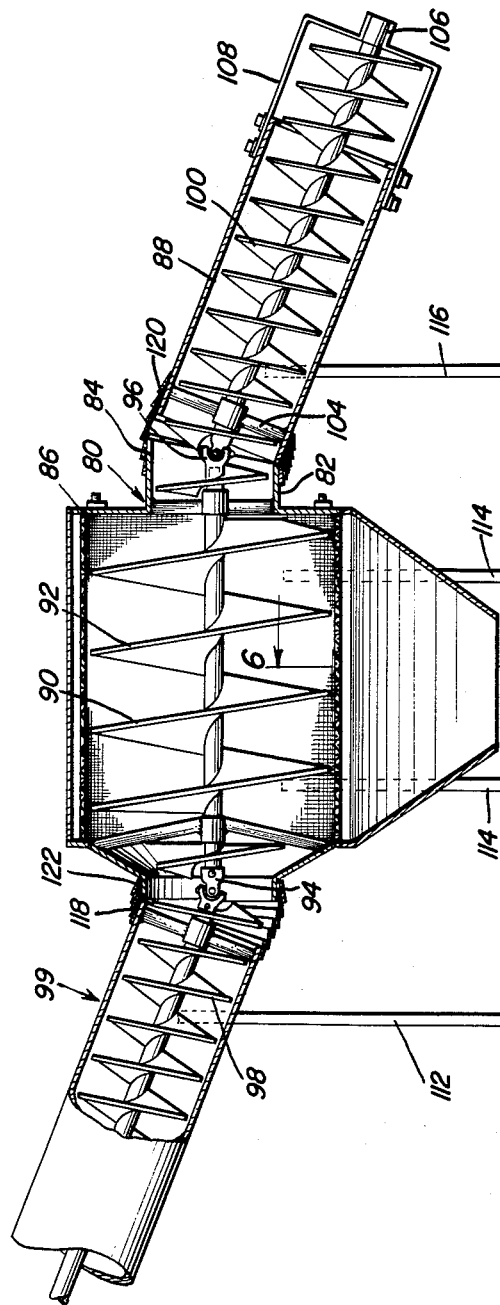
FIGURE 5 is a longitudinal sectional view similar to that of FIGURE 1 but showing a modified form of attachment.

Referring now more specifically to the drawings the numeral 10 generally designates a conventional form of auger conveyor including a generally cylindrical housing 12 having an elongated screw conveyor member 14 journaled therein. The attachment of the instant invention is generally designated by the reference numeral 16 and includes an elongated cylindrical body 18 including a diametrically enlarged center section 20 and diametrically reduced inlet and outlet end sections 22 and 24.

The center section 20 includes a first substantially planar partial inlet end wall 25 and a generally truncated cone-shaped partial outlet end wall 26. A substantially cylindrical foraminated member 28 extends between the end walls 25 and 26 and is enclosed within a generally cylindrical outer cover 30 which is also secured between the end walls 25 and 26, the cover 30 including a generally radially outwardly projecting discharge neck 32 secured to the lower surfaces of the cover 30 which define an opening 34.

The attachment 16 includes a screw conveyor element generally referred to by the reference numeral 36 including a large diametrically enlarged center portion 38 and a pair of smaller inlet and outlet end portions 40 and 42 snugly but loosely received in the center section 20 and the inlet and outlet sections 22 and 24, respectively. The screw conveyor element 36 is rotatably supported by means of a first journal web 44 mounted in the outlet end of the outlet section 22 and a second journal web 46 mounted in the truncated cone-shaped end portion 26. In addition, it will be noted that the conveyor element 36 projects outwardly of the inlet end of the inlet section 22 and has its free end journaled by means of a bearing journal 48 supported from the adjacent end of the inlet section 22 by means of a support bracket 50.

Figure 4:
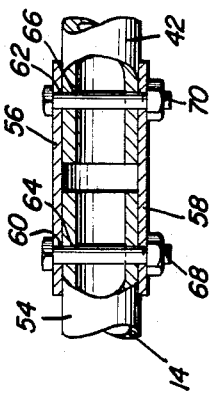
FIGURE 4 is a fragmentary enlarged longitudinal sectional view taken substantially upon the plane indicated by the section line 4—4 of FIGURE 3.

The screw conveyor member 14 includes an end portion 54 which is telescopingly received within the outlet end section 24 and which is drivingly coupled to the adjacent end of the conveyor element 36 by means of a sleeve-type coupling member 56. The sleeve-type coupling member 56 includes a coupling sleeve, see FIGURE 4, 58 having a pair of diametric bores 60 and 62 formed therein. The adjacent ends of the conveyor member 14 of the conveyor element 36 are provided with complementary diametric bores 64 and 66 which are registrable with the bores 60 and 62, respectively and a pair of fasteners 68 and 70 are secured through the registered bores 60 and 64 and 62 and 66, respectively. In this manner, the conveyor member 14 is drivingly coupled to the conveyor element 36 and the inlet end of the end section 22 may be disposed in a mound 74 of grain in order that grain may be conveyed upwardly through the attachment 16 and into the center section 20 thereof wherein the small unwanted particles of weed seed and dirt will pass outwardly through the reticulated member 28 and fall downwardly into the lower portion of the cover 30 and outwardly through the outlet neck 32, the desirable grain seed passing upwardly through the attachment 16 and into the grain auger conveyor 10.

Figure 6:
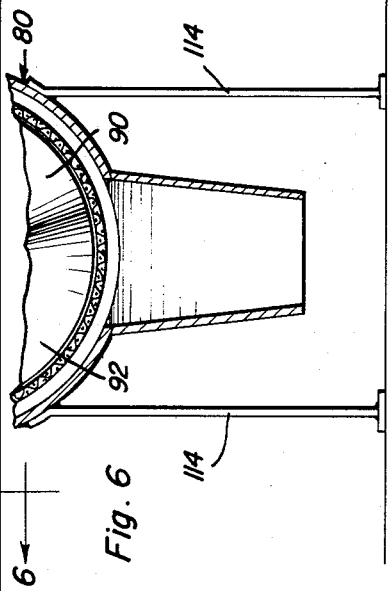
FIGURE 6 is a fragmentary transverse vertical sectional view taken substantially upon the plane indicated by the section line 6—6 of FIGURE 5.

With attention now directed more specifically to FIGURES 5 and 6 of the drawings there will be seen a modified form of attachment generally referred to by the reference numeral 80. The attachment 80 is similar in substantially all respects to the attachment 16 except that the inlet end section 82 thereof includes a first section 84 fixed relative to the center section 86 and an articulated section 88. The center section 86 has an enlarged portion 90 of the screw conveyor element 92 of the attachment 80 journaled therein and a pair of universal joints 94 and 96 are secured to the outlet and inlet ends of the center section 92. The conveyor member 98 of the grain auger conveyor generally referred to by the reference numeral 99 is also secured to the universal joint 94 and is therefore drivingly coupled to the conveyor element 90. The conveyor element 100 disposed in the articulated section 88, to which the universal joint 96 is connected, is driven by the conveyor element 92.

The conveyor element 100 is journaled in the articulated section 88 by means of a journal web 104 and a journal 106 disposed outwardly of the inlet end thereof and supported by means of a bracket 108. In addition, it may be seen that the grain auger conveyor generally referred to by the reference numeral 99 in which the conveyor member 98 is disposed includes a pair of supporting legs 112, that the center section 86 includes two pairs of supporting legs 114, and that the articulated end section 88 includes a pair of supporting legs 116.

The articulated connections between the center section 86 and the grain auger conveyor 99 and the articulated section 88 are enclosed by means of flexible generally cylindrical boots or housings 118 and 120. The boot 118 is telescoped over the adjacent ends of the grain auger conveyor 99 and the outlet end section 122 of the attachment 80 while the boot 120 is telescoped over the adjacent ends of the articulated end section 88 and the inlet end section 82 of the attachment 80.

Instead of using means corresponding to the articulated connections between the attachment 80 and the grain auger conveyor 99 and the articulated section 88 for connecting the housing 12 to the attachment 16, the butted ends of the housing 12 and the outlet section 24 are fixedly secured to each other by means of a clamp-type assembly generally referred to by the reference numeral 126 and including a pair of generally semispherical members 128 and 130 including corresponding laterally directed aperture flange portions 132 and 134 respectively. A plurality of fasteners 136 are secured through each pair of corresponding flanges 132 and 134 to clampingly engage the members 128 and 130 tightly about the outlet section 124 and the adjacent end of the housing 12. Inasmuch as a rigid connection defined by the clamp assembly 126 is utilized, there is no need for a universal joint to drivingly couple the elongated screw conveyor member 14 to the screw conveyor element 36 and therefore the relatively simple sleeve-type coupling member 56 may be used to advantage for drivingly coupling the conveyor member 14 to the conveyor element 36.

From the foregoing description it may be appreciated that the attachments 16 and 80 operate in the same manner and that the grain conveyed therethrough may have the smaller weed seeds and smaller particles of dirt removed therefrom while the grain being conveyed passes through the center sections 20 and 86. Further, it may be appreciated that the attachments 16 and 80 may be readily connected to substantially all types of grain auger conveyors such as those designated by the reference numerals 10 and 99 and also that the attachments 16 and 80 need no additional power source inasmuch as they are driven from the conventional auger conveyor with which they are associated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a grain auger conveyor of the type including a generally cylindrical housing having an elongated screw conveyor member journaled therein, said attachment including an elongated cylindrical body including a diametrically enlarged center section and diametrically reduced inlet and outlet end sections, said center section including a generally truncated cone-shaped end which tapers into the adjacent end of the outlet end section, a screw conveyor element journaled in said cylindrical body and including a diametrically enlarged center portion and a pair of diametrically reduced opposite end portions snugly but loosely received in said center and opposite end portions, respectively, said center and opposing end portions being slightly axially spaced apart, at least a portion of the enlarged portion of said body extending circumferentially thereabout, and a major portion of the length thereof being defined by a screen-like member, an outer generally cylindrical and further enlarged cover secured over said screen-like member, said cover defining a radially outwardly opening discharge opening therein and a generally radially outwardly projecting discharge neck secured at its inner inlet end to said cover about said opening, the free end of said outlet section being adapted to be secured to the inlet end of said housing in closed communication therewith and the corresponding end of said screw conveyor element being adapted to be removably coupled to and driven by said screw conveyor member, the portion of said screw conveyor element disposed in said outlet section including an end portion snugly received in and conforming to the shape of said cone-shaped portion and axially spaced from said center portion, said cylindrical housing including axially spaced and aligned internally disposed journal webs rotatably journaling said screw conveyor element between said center and said opposite end portions thereof.

2. The combination of claim 1 wherein the opposite ends of said screw conveyor element each include a universal joint, and a flexible generally cylindrical coupling member telescoped over the outlet end of said outlet end section at one end and adapted, at the other end, to be telescoped over the inlet end of said housing.

3. The combination of claim 1 wherein the outlet end of said outlet end section is adapted to be end abutted with the inlet end of said housing, a clamp including a plurality of generally partial cylindrical sections supported from said outlet end section for radial inward movement of the cylindrical passage defined therebetween and telescoped over the free end of said outlet end section and adapted to be clampingly telescoped over the inlet end of said cylindrical housing for securing said attachment to said housing.

4. The combination of claim 3 wherein said cover includes a plurality of depending support legs projecting laterally outwardly therefrom.

References Cited by the Examiner

UNITED STATES PATENTS

| | | | |
|---|---|---|---|
| 369,768 | 9/1887 | Booker | 209—296 X |
| 1,226,588 | 5/1917 | Perry | 198—213 |
| 1,533,997 | 4/1925 | Stinson. | |
| 1,541,163 | 6/1925 | Westhafer et al. | |
| 2,296,007 | 9/1942 | Weisenberger | 198—213 X |

FOREIGN PATENTS 93,244  8/1959  Netherlands.

EVON C. BLUNK, *Primary Examiner.*

HUGO O. SCHULZ, *Examiner.*

R. HICKEY, *Assistant Examiner.*